(12) United States Patent
Duncan et al.

(10) Patent No.: US 10,328,830 B2
(45) Date of Patent: Jun. 25, 2019

(54) SEAT ASSEMBLY HAVING A BOLSTER SUBASSEMBLY (71) Applicant: Lear Corporation, Southfield, MI (US)

(72) Inventors: Bradley C. Duncan, Harrison Township, MI (US); Richard A. Sams, Southfield, MI (US); Ronald L. Miotto, Redford, MI (US)

(73) Assignee: Lear Corporation, Southfield, MI (US)

( * ) Notice: Subject to any disclaimer, the term of this patent is extended or adjusted under 35 U.S.C. 154(b) by 226 days.

(21) Appl. No.: 15/292,207

(22) Filed: Oct. 13, 2016

(65) Prior Publication Data
US 2018/0105085 A1 Apr. 19, 2018

(51) Int. Cl.
B60N 2/68 (2006.01)
B60N 2/58 (2006.01)
B60N 2/64 (2006.01)

(52) U.S. Cl.
CPC .............. B60N 2/686 (2013.01); B60N 2/58 (2013.01); B60N 2/643 (2013.01); B60N 2/646 (2013.01); B60N 2/682 (2013.01)

(58) Field of Classification Search
None
See application file for complete search history.

(56) References Cited

U.S. PATENT DOCUMENTS

| | | | |
|---|---|---|---|
| 5,102,196 A * | 4/1992 | Kaneda | A47C 7/405 297/285 |
| 5,788,272 A | 8/1998 | Yanase | |
| 6,152,534 A * | 11/2000 | Maeda | B60N 2/5825 297/218.3 |
| 6,814,412 B2 | 11/2004 | Cramb, III et al. | |
| 7,216,936 B2 * | 5/2007 | Peterson | A47C 7/24 297/284.4 |
| 8,251,454 B2 * | 8/2012 | Tsukiji | A47C 7/282 297/219.1 |
| 8,876,154 B2 | 11/2014 | Tracht et al. | |
| 9,120,411 B2 | 9/2015 | Clauser et al. | |
| 9,193,289 B2 | 11/2015 | Takahashi et al. | |
| 2008/0001447 A1 * | 1/2008 | Humer | B60N 2/4228 297/216.12 |
| 2008/0211274 A1 * | 9/2008 | Tracht | B60N 2/5816 297/216.13 |
| 2011/0121624 A1 * | 5/2011 | Brncick | B60N 2/0232 297/284.2 |
| 2014/0049090 A1 * | 2/2014 | Mori | B60N 2/5825 297/452.49 |

(Continued)

FOREIGN PATENT DOCUMENTS

EP 2631126 A1 8/2013
WO 2014054553 A1 4/2014

OTHER PUBLICATIONS

U.S. Appl. No. 14/982,352, filed Dec. 29, 2015.

Primary Examiner — David E Allred
(74) Attorney, Agent, or Firm — Brooks Kushman P.C.

(57) ABSTRACT

A seat assembly having a seat back and a bolster subassembly. The bolster subassembly may have a bolster frame and a bolster trim subassembly. The bolster frame may be mounted to a back panel of the seat back. The bolster trim subassembly may be received between the bolster frame and the back panel when the bolster subassembly is mounted to the seat back.

20 Claims, 7 Drawing Sheets (56) References Cited

U.S. PATENT DOCUMENTS

| | | | |
|---|---|---|---|
| 2015/0336528 A1* | 11/2015 | Tanabe | B60R 21/207 280/728.2 |
| 2018/0037144 A1* | 2/2018 | Makita | A47C 31/02 |
| 2018/0126886 A1* | 5/2018 | Line | B60N 2/80 |

* cited by examiner

SEAT ASSEMBLY HAVING A BOLSTER SUBASSEMBLY

TECHNICAL FIELD

This disclosure relates to a seat assembly having a bolster subassembly.

BACKGROUND

A seat assembly having a side bolster is disclosed in U.S. Pat. No. 8,876,154.

SUMMARY

In at least one embodiment, a seat assembly is provided. The seat assembly may include a seat back. The seat back may include a seat back frame, a back panel, and a bolster subassembly. The back panel may be disposed on the seat back frame. The back panel may have a plurality of mounting tabs that may extend away from the seat back frame. The bolster subassembly may include a bolster frame, a bolster cushion, and a bolster trim subassembly. The bolster frame may have a plurality of openings that receive corresponding mounting tabs to mount the bolster frame to the back panel. The bolster cushion may be disposed on the bolster frame. The bolster trim subassembly may be disposed on the bolster cushion. The bolster trim subassembly may include a bolster trim cover and a bolster trim cover stiffener. The bolster trim cover stiffener may extend from an edge of the bolster trim cover. The bolster trim cover and the bolster trim cover stiffener may be received between the bolster frame and the back panel when the bolster subassembly is mounted to the seat back frame.

In at least one embodiment, a seat assembly is provided. The seat assembly may include a seat back. The seat back may include a seat back frame, a back panel, and a bolster subassembly. The back panel may be fixedly disposed on the seat back frame and may define a back side of the seat back. The bolster subassembly may include a bolster frame and a bolster trim subassembly. The bolster frame may be mounted to the seat back frame. The bolster frame may have a mounting channel and a mounting arm. The mounting channel may be disposed along a lateral side of the seat back. The mounting arm may extend away from the mounting channel. The mounting arm may be fastened to the seat back frame and the back panel. The bolster trim subassembly may include a bolster trim cover and a bolster trim cover stiffener. The bolster trim cover stiffener may be attached to the bolster trim cover. The bolster trim cover, bolster trim cover stiffener, and the back panel may be received in the mounting channel.

In at least one embodiment, a seat assembly is provided. The seat assembly may include a seat back. The seat back may include a seat back frame, a back panel, and a bolster subassembly. The back panel may be disposed on the seat back frame. The bolster subassembly may include a bolster frame and a bolster trim subassembly. The bolster frame may be disposed on the seat back frame and the back panel. The bolster frame may have a perimeter wall and a front wall that may at least partially define a mounting channel that receives the back panel. The bolster trim subassembly may be disposed on the bolster frame. The bolster trim subassembly may include a bolster trim cover and a bolster trim cover stiffener. The bolster trim cover stiffener may be attached to the bolster trim cover. The bolster trim cover and the bolster trim cover stiffener may be received in the mounting channel. The bolster trim cover stiffener may be secured between the back panel and the bolster frame.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
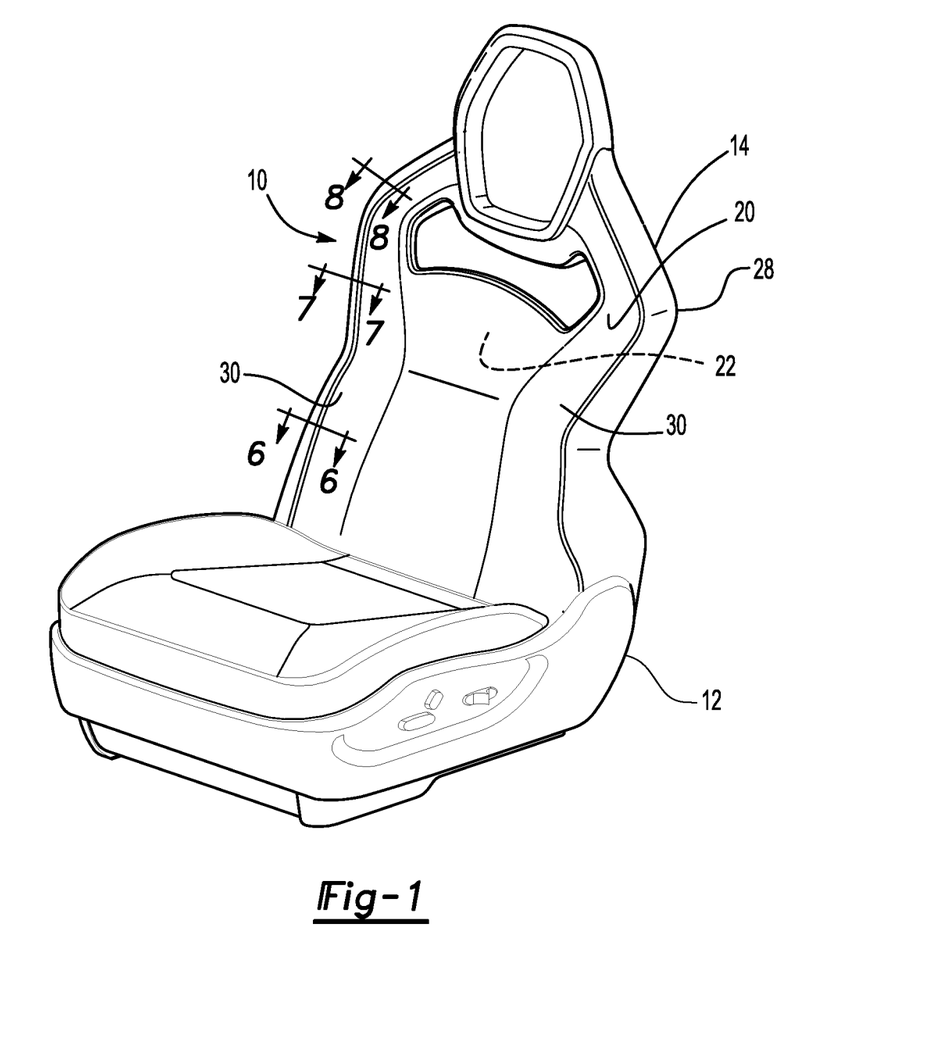
FIG. 1 is a perspective view of a vehicle seat having a seat back and a bolster subassembly.

Referring to FIG. 1, an example of a seat assembly 10 is shown. The seat assembly 10 may be provided with or configured for use with a vehicle, such as a motor vehicle like a car or truck.

The seat assembly 10 may be configured as a bucket seat and may be positioned in a front seating row of a vehicle. The seat assembly 10 may include a seat bottom 12 and a seat back 14.

The seat bottom 12 may be configured to support a seat occupant. The seat bottom 12 may be configured to be mounted on a support surface, such as a vehicle body structure like a floor pan of a vehicle. The seat bottom 12 may be disposed on a track assembly that may allow the seat bottom 12 to move forward and backward in the vehicle. The track assembly may be mounted on the support surface.

The seat back 14 may be configured to support the back of a seat occupant. The seat back 14 may be pivotally mounted on the seat bottom 12. As is best shown with reference to FIGS. 1 and 2, the seat back 14 may include a trim cover assembly 20, a cushion 22, seat back frame 24, a headrest frame 26, a back panel 28, and one or more bolster subassemblies 30.

Referring to FIG. 1, the trim cover assembly 20 may form an exterior surface of at least a portion of the seat back 14. The trim cover assembly 20 may be made of any suitable material, such as fabric, vinyl, leather, or combinations thereof. The trim cover assembly 20 may engage and may at least partially cover or conceal the cushion 22.

The cushion 22 may be disposed under the trim cover assembly 20. The cushion 22 may be made of any suitable material, such as foam or a molded polymeric material. In addition, the cushion 22 may generally be disposed at the center of the seat back 14 between the bolster subassemblies 30.

Figure 2:
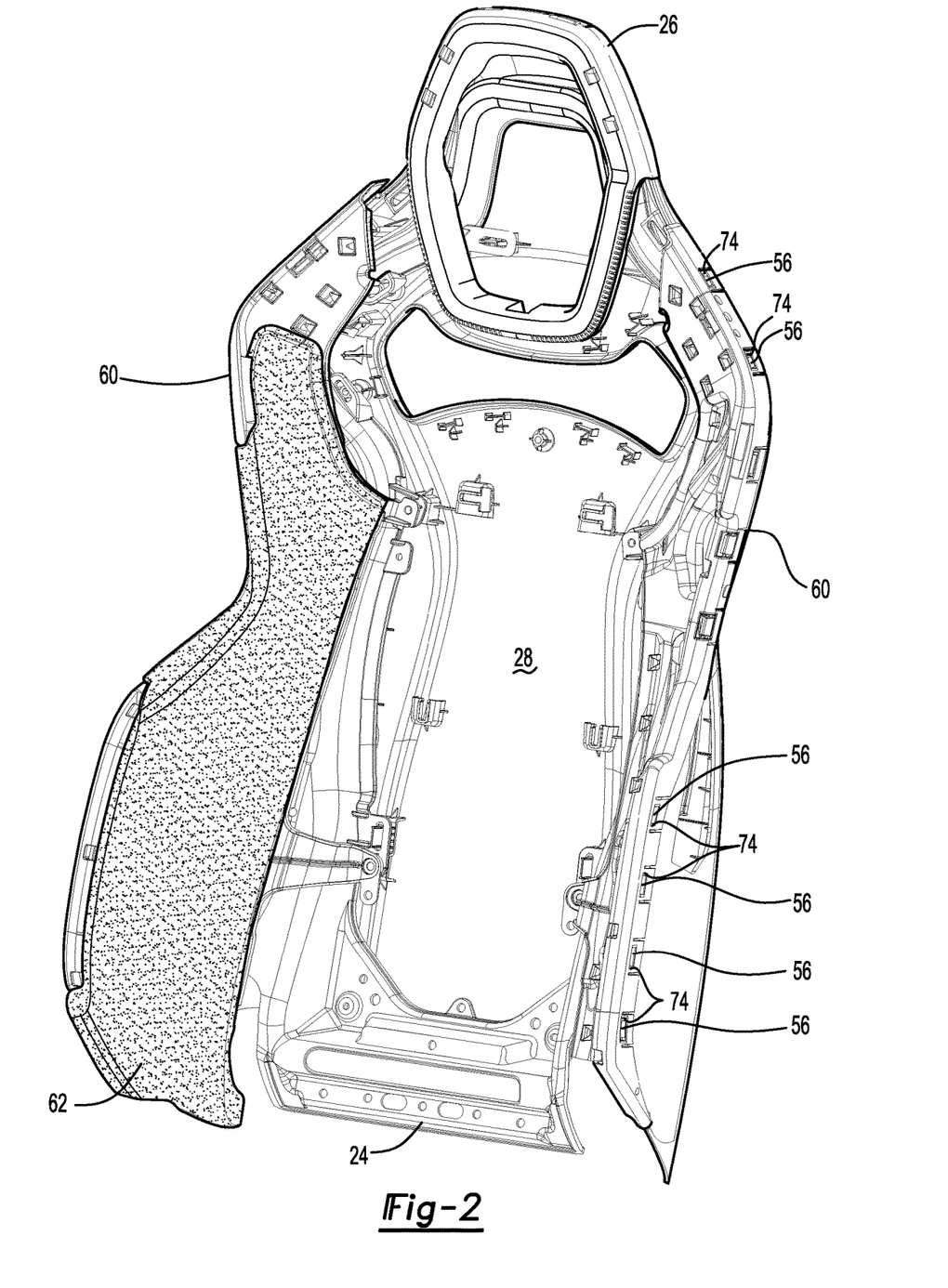
FIG. 2 is a perspective view showing a seat back frame, headrest frame, back panel, and bolster frames that may be provided with the seat back.
Figure 3:
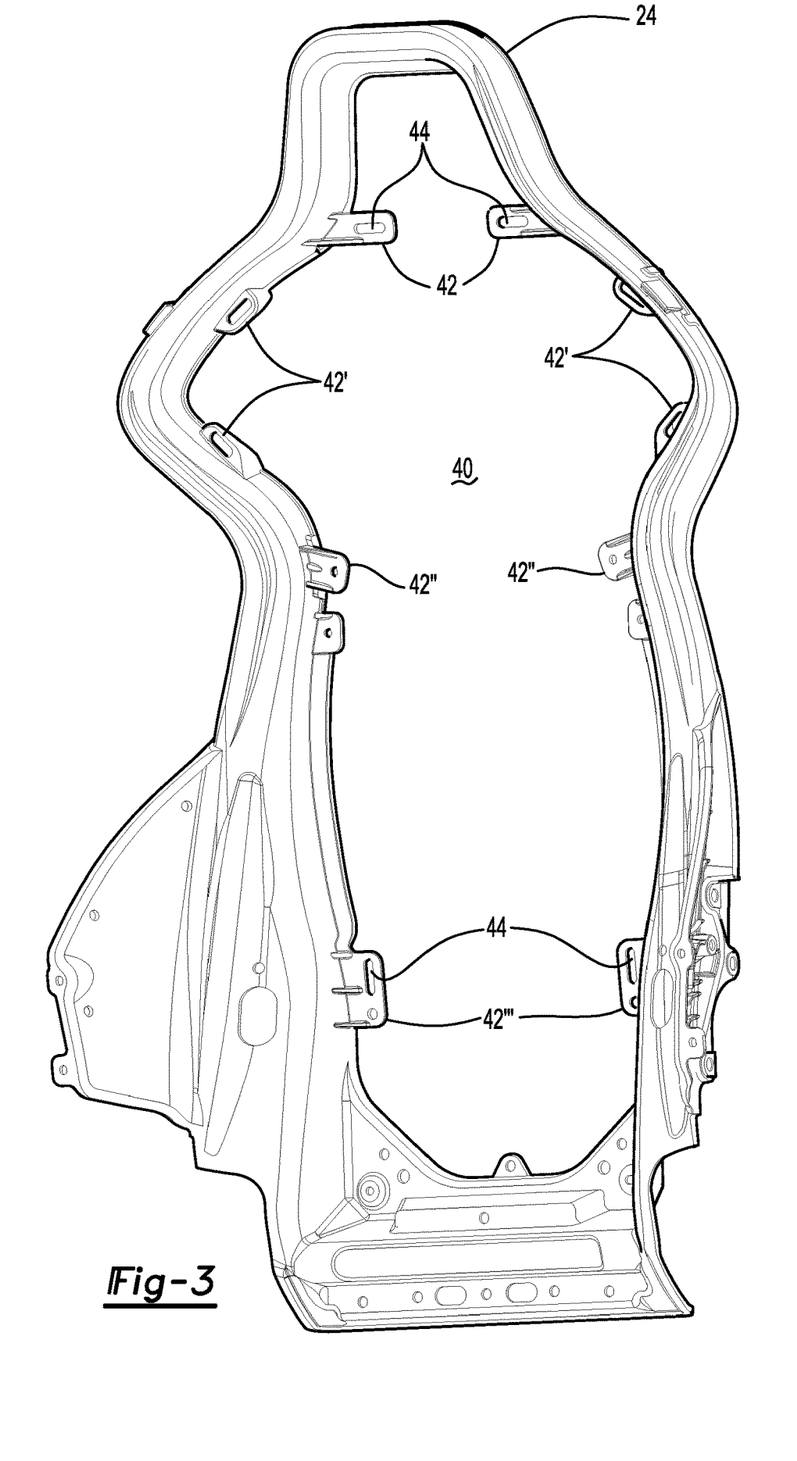
FIG. 3 is a perspective view of the seat back frame of FIG. 2.

Referring to FIGS. 2 and 3, the seat back frame 24 may provide a support structure for the seat back 14 and may facilitate mounting of various components to the seat back 14. The seat back frame 24 may be made of any suitable material or materials, such as carbon fiber, metal, a polymeric material, or combinations thereof. In addition, the seat back frame 24 may be provided as a unitary or one piece component and may be substantially symmetrical with respect to a center line or center plane of the seat back 14 that may extend from the top to the bottom of the seat back frame 24. In the configuration shown, the seat back frame 24 has a generally ring shaped configuration that may define a seat back frame opening 40.

The seat back frame 24 may also have a plurality of mounting flanges that may protrude or extend from the seat back frame 24 into the seat back frame opening 40. The mounting flanges may facilitate mounting of the headrest frame 26, back panel 28, and bolster subassemblies 30 to the seat back frame 24.

The mounting flanges may be provided in various configurations. For instance, a pair of mounting flanges 42 may be disposed near the top of the seat back frame 24 and near the headrest frame 26. The mounting flanges 42 may each have a mounting flange slot 44 that may receive a corresponding alignment feature that may extend from the back panel 28. Two additional pairs of mounting flanges 42' may receive fasteners, such as screws, that may extend through the back panel 28 to mount the back panel 28 to the seat back frame 24. Another pair of mounting flanges 42" may receive fasteners, such as screws, that may extend through a bolster frame of the bolster subassembly 30 to the back panel 28 to couple the bolster subassembly 30 and the back panel 28 to the seat back frame 24. Another pair of mounting flanges 42''' may be disposed near the bottom of the seat back frame 24 between the bolster subassemblies 30. The mounting flanges 42''' may each have a mounting flange slot 44 that may receive a corresponding alignment feature that may extend from the back panel 28 and a hole that may receive a fastener that may extend through the bolster frame of the bolster subassembly 30 to the back panel 28 to couple the bolster subassembly 30 and the back panel 28 to the seat back frame 24.

Referring to FIG. 2, the headrest frame 26 may be disposed at the top of the seat back frame 24 and may help support the head of a seat occupant. In the configuration shown, the headrest frame 26 has a ring shaped configuration and may be positioned such that the seat back frame 24 is disposed between the headrest frame 26 and the back panel 28. The headrest frame 26 may be coupled to the back panel 28 in any suitable manner. For example, the headrest frame 26 may receive one or more mounting tabs that may extend from the back panel 28 into corresponding openings in the headrest frame 26. Alternatively or in addition, the headrest frame 26 may be attached to the back panel 28 with one or more fasteners, such as screws.

Figure 4:
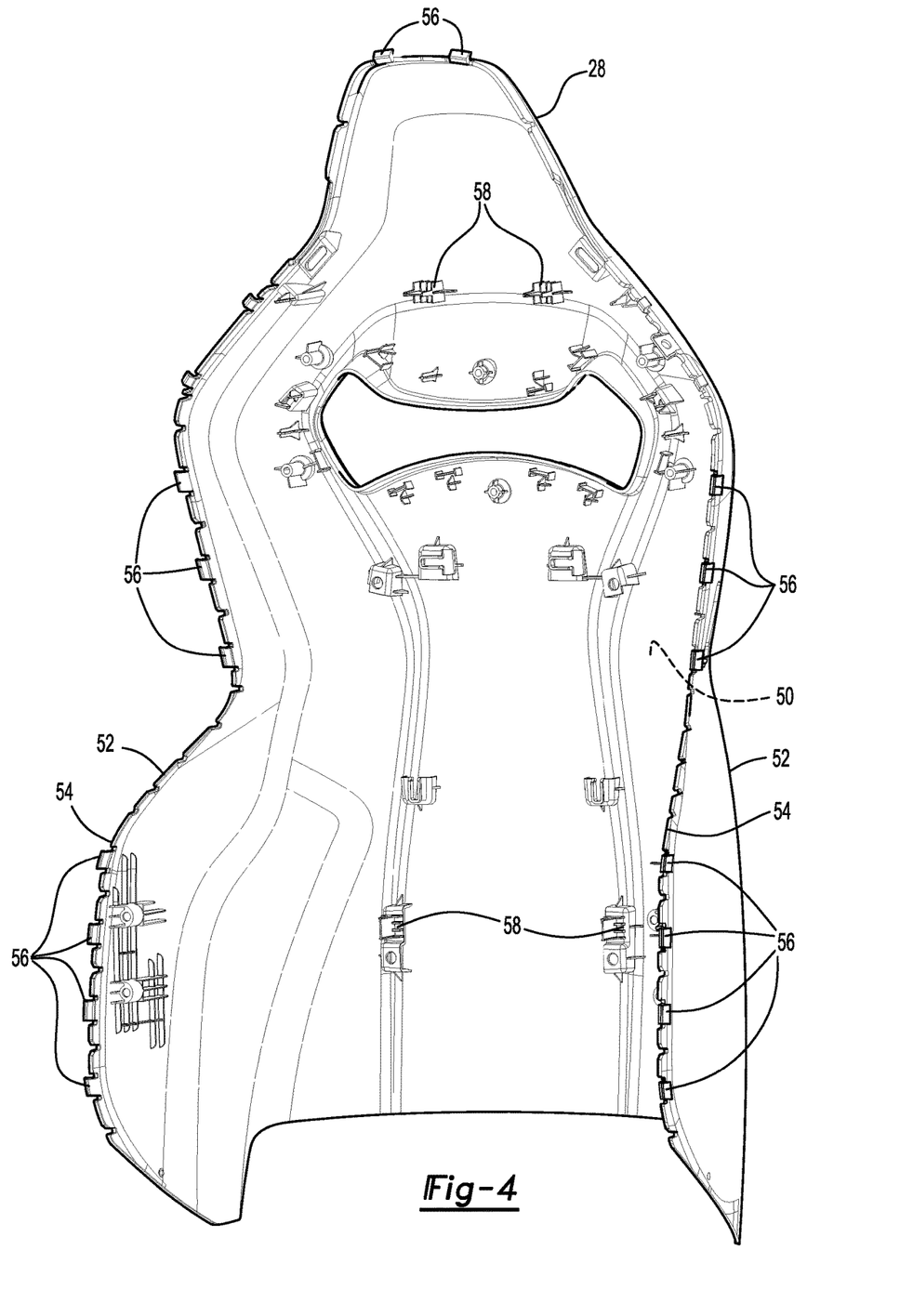
FIG. 4 is a perspective view of the back panel of FIG. 2.

Referring to FIGS. 2 and 4, the back panel 28 may be fixedly disposed on the seat back frame 24. The back panel 28 may be provided as a unitary or one piece component and may be substantially symmetrical with respect to a center line or center plane of the seat back 14 that may extend from the top to the bottom of the seat back 14. The back panel 28 may be made of any suitable material or materials, such as a polymeric material.

The back panel 28 may extend across the back of the seat back 14 and may form a back side 50 of the seat back 14. In addition, the back panel 28 may wrap around or extend forward and form at least a portion of the lateral sides 52 of the seat back 14. The lateral sides 52 of the back panel 28 may terminate at an end surface 54 that may be at least partially received in a bolster subassembly 30 as will be discussed in more detail below. In at least one embodiment, the back panel 28 may include a plurality of mounting tabs 56 and one or more alignment features 58.

The mounting tabs 56 that may be spaced apart from each other and may be arranged around a portion of the perimeter of the back panel 28. The mounting tabs 56 may be disposed proximate the end surface 54 and may extend outwardly or away from the seat back frame 24. The mounting tabs 56 may facilitate mounting of the headrest frame 26 and the bolster subassemblies 30 to the back panel 28. For instance, one or more mounting tabs 56 may be disposed proximate the top of the back panel 28 to facilitate mounting of the headrest frame 26 to the back panel 28. In addition, a plurality of mounting tabs 56 may be arranged along the lateral sides or left and right sides of the back panel 28 to facilitate mounting of a corresponding bolster subassembly 30 to the back panel 28. The mounting tabs 56 may each have a barb or hook that may engage the bolster subassembly 30 inhibit removal of the bolster subassembly 30 from the back panel 28.

The alignment features 58 may facilitate alignment and/or mounting of the back panel 28 to the seat back frame 24. The alignment features 58 may extend away from the back side 50 and may have any suitable configuration. For instance, at least a portion of an alignment feature 58 may be provided with an I-beam cross section that may be received in a corresponding mounting flange slot 44 of the seat back frame 24.

Referring to FIG. 1, one or more bolster subassemblies 30 may be provided with the seat back 14. For example, a pair of bolster subassemblies 30 may be provided that may generally extend along opposing lateral sides or left and right sides of the seat back 14. The bolster subassemblies 30 may be spaced apart from each other and may extend forwardly or away from the back side 50 of the seat back 14. In addition, the bolster subassemblies 30 may extend from the bottom of the seat back 14 toward the top of the seat back 14 and may terminate below the top of the seat back 14. The bolster subassemblies 30 may have mirror symmetry with respect to a center plane of the seat back 14. As such, a single bolster subassembly 30 will generally be described below for brevity. As is best shown with reference to FIGS. 2, 5 and 6, the bolster subassembly 30 may include a bolster frame 60, a bolster cushion 62, and a bolster trim subassembly 64.

Figure 5:
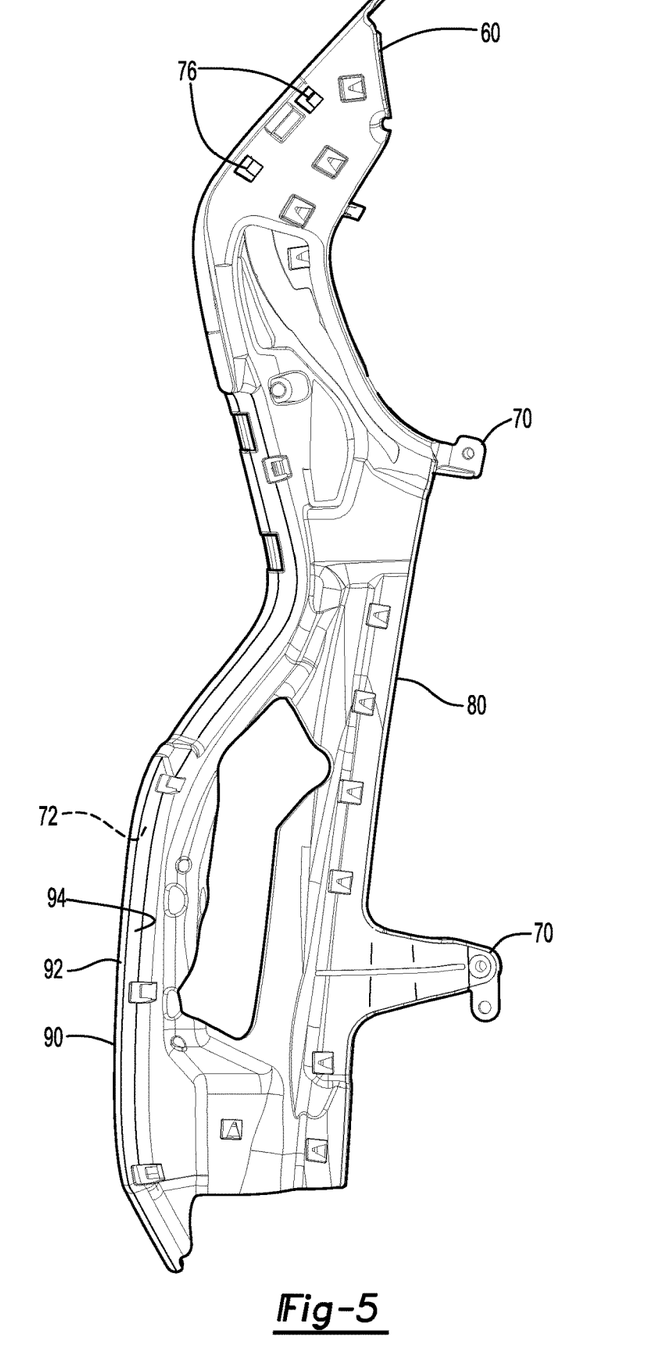
FIG. 5 is a perspective view of a bolster frame that is shown in FIG. 2.

Referring to FIGS. 2 and 5, the bolster frame 60 may provide a support structure for the bolster subassembly 30 and may facilitate mounting of various components to the bolster frame 60. In addition, the bolster frame 60 may facilitate mounting of the bolster subassembly 30 to the seat back frame 24 and the back panel 28. The bolster frame 60 may be made of any suitable material or materials, such as carbon fiber, metal, a polymeric material, or combinations thereof. In addition, the bolster frame 60 may be provided as a unitary or one piece component. In at least one embodiment, the bolster frame 60 may include a mounting arm 70, a mounting channel 72, a plurality of mounting openings 74, and one or more bolster trim cover support features 76.

One or more mounting arms 70 may facilitate mounting of the bolster frame 60 to the seat back frame 24, the back panel 28, or both. In the embodiment shown, two mounting arms 70 are provided that extend from an interior side 80 of the bolster frame 60 toward the center of the seat back 14. As such, the mounting arms 70 may generally extend away from the mounting channel 72 and away from the outer perimeter or lateral perimeter of the bolster frame 60. Each mounting arm 70 may be disposed on a corresponding mounting flange of the seat back frame 24. For example, an upper mounting arm 70 may engage and may be fastened to mounting flange 42″ while a lower mounting arm 70 may engage and may be fastened to mounting flange 42‴ and the back panel 28. The lower mounting arm 70 may also be disposed on the mounting flange 42‴ adjacent to the mounting flange slot 44. A fastener may extend from or through each mounting arm 70 and through the mounting flange 42‴ and into the back panel 28 to couple the bolster subassembly 30 to the seat back frame 24 and to the back panel 28.

The mounting channel 72 may receive the back panel 28 and the bolster trim subassembly 64. The mounting channel 72 may be disposed opposite the interior side 80 of the bolster frame 60 and may extend between the top and the bottom of the bolster frame 60. As such, the mounting channel 72 may be disposed along a lateral side of the seat back 14. As is best shown with reference to FIGS. 5 and 6, the mounting channel 72 may be at least partially defined by a perimeter wall 90, a front wall 92, and an inner wall 94.

Figure 6:
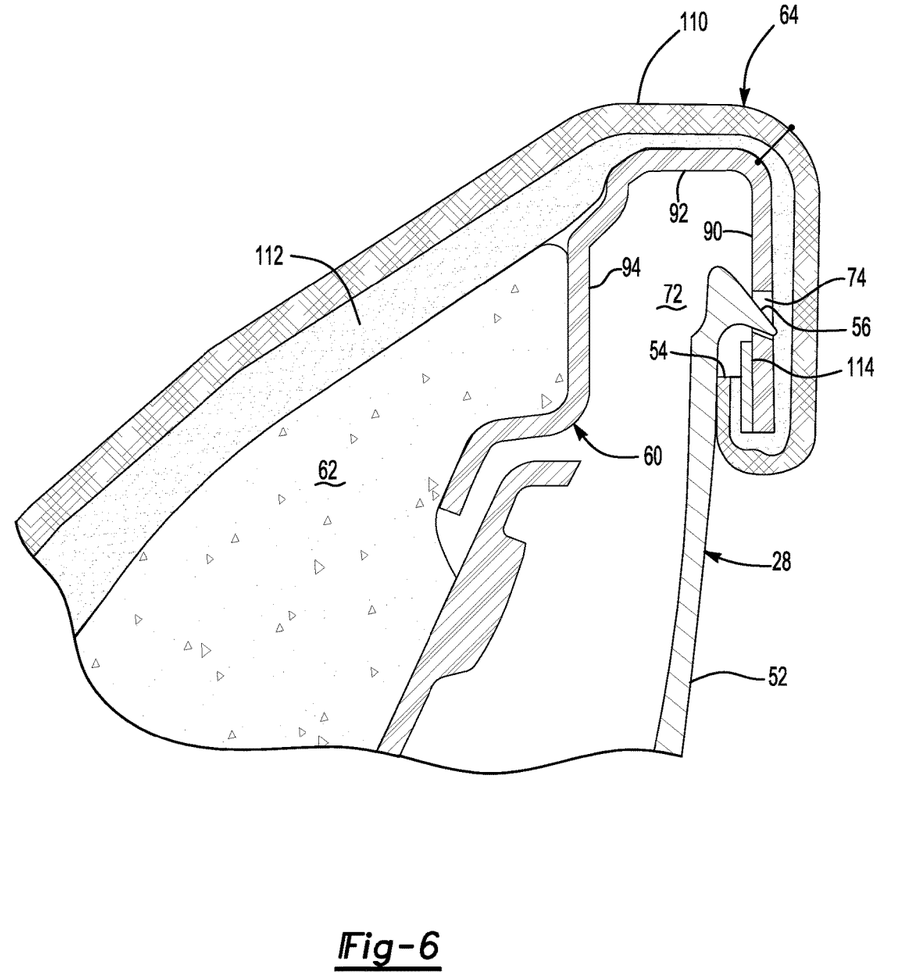
FIG. 6 is a section view along section line 6-6.

The perimeter wall 90 may define at least a portion of the lateral perimeter of the bolster frame 60. The perimeter wall 90 may extend rearward from the front wall 92 toward the back side 50 of the seat back 14. The perimeter wall 90 may be disposed substantially perpendicular to the front wall 92 in one or more embodiments. The perimeter wall 90 may include the mounting openings 74. As such, the perimeter wall 90 may engage the back panel 28.

The front wall 92 may face toward the front of the seat back 14. The front wall 92 may extend from the perimeter wall 90 to the inner wall 94. For example, the front wall 92 may extend from an end of the perimeter wall 90 to an end of the inner wall 94.

The inner wall 94 may be disposed opposite the perimeter wall 90. In addition, the inner wall 94 may be spaced apart from and may not engage the perimeter wall 90. The inner wall 94 may also be spaced apart from and may not engage the back panel 28.

The mounting openings 74 may facilitate mounting of the bolster subassembly 30 to the back panel 28. For example, one or more mounting openings 74 that may be configured as through holes may be provided in the perimeter wall 90. Each mounting opening 74 may receive a corresponding mounting tab 56 of the back panel 28. The mounting tab 56 may extend through a corresponding mounting opening 74 in a direction that extends outwardly from the mounting channel 72 toward the lateral or exterior side of the perimeter wall 90.

Figures 7, 8:
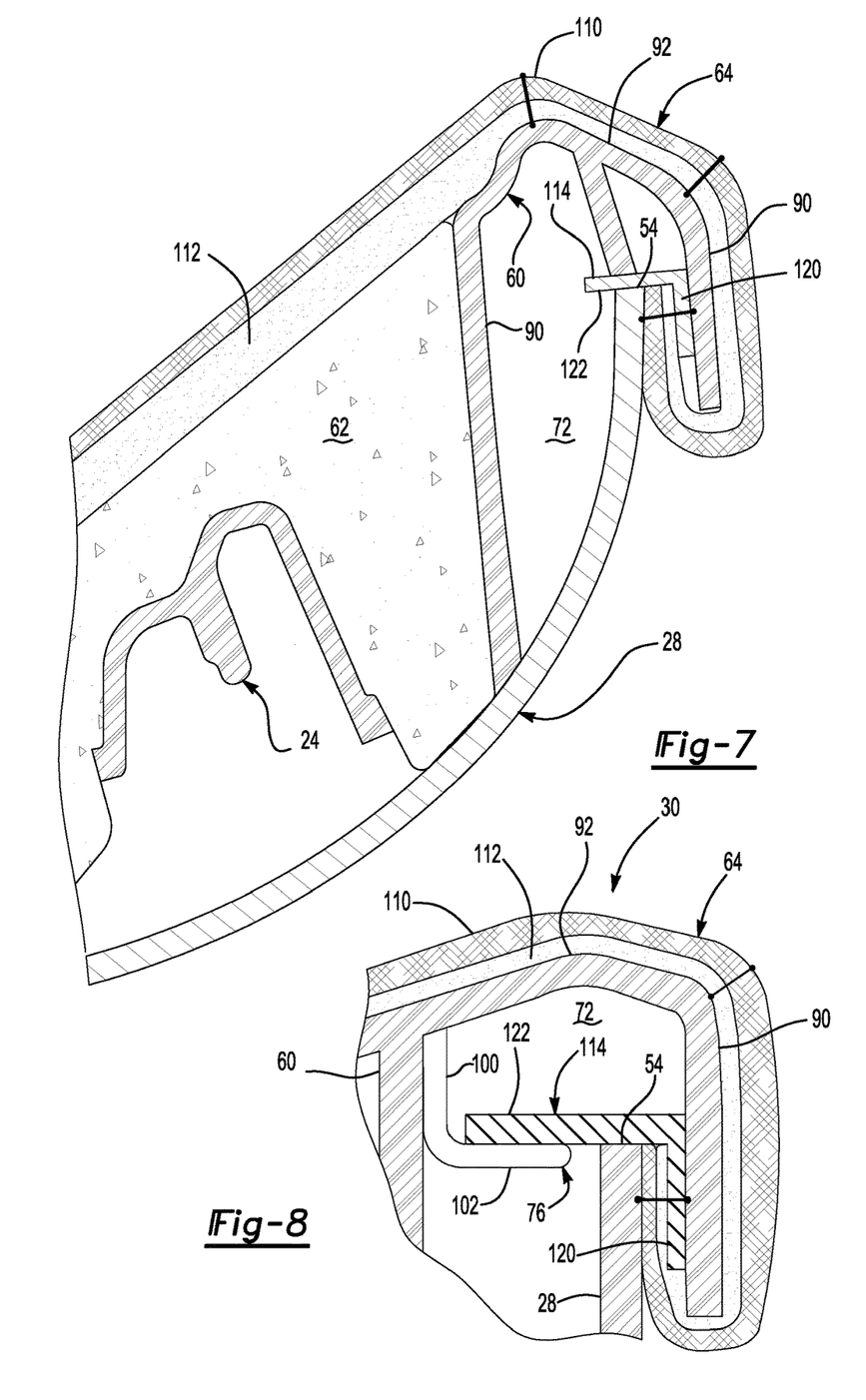
FIG. 7 is a section view along section line 7-7.
FIG. 8 is a section view along section line 8-8 showing a bolster trim cover support feature that may be provided with a bolster frame.

Referring to FIGS. 5 and 8, one or more bolster trim cover support features 76 may be provided to facilitate mounting of the bolster trim subassembly 64 to the bolster frame 60. The bolster trim cover support feature 76 may extend from the front wall 92 toward the back side 50 of the seat back 14. The bolster trim cover support feature 76 may support a bolster trim cover stiffener of the bolster trim subassembly 64 as will be discussed in more detail below. In at least one configuration, the bolster trim cover support feature 76 may have a generally L-shaped configuration that may include a first wall 100 and a second wall 102. The first wall 100 may extend from the front wall 92 toward the back panel 28. The second wall 102 may extend from the first wall 100 toward the perimeter wall 90 and toward the end surface 54 of the back panel 28. For example, the second wall 102 may extend from an end of the first wall 100 and may be disposed substantially perpendicular to the first wall 100. A hole may be provided in the front wall 92 where each bolster trim cover support feature 76 is provided.

Referring to FIGS. 2 and 6, the bolster cushion 62 may be disposed under the bolster trim subassembly 64. In addition, the bolster cushion 62 may be disposed on a side of the bolster frame 60 that may face away from the back side 50 of the seat back 14. In at least one embodiment, the bolster cushion 62 may extend from the bottom of the bolster frame 60 toward the top of the bolster frame 60. In addition, the bolster cushion 62 may be disposed between the mounting channel 72 and an interior side 80 of the bolster frame 60 that may be disposed opposite the mounting channel 72. For example, the bolster cushion 62 may extend from the inner wall 94 of the bolster frame 60 toward the interior side 80. The bolster cushion 62 may be made of any suitable material, such as foam or a molded polymeric material. In addition, the bolster cushion 62 may be a separate component from the cushion 22.

Referring to FIG. 6, the bolster trim subassembly 64 may form an exterior surface of at least a portion of the bolster subassembly 30. In addition, the bolster trim subassembly 64 may be mounted to or secured to the bolster frame 60. In at least one configuration, the bolster trim subassembly 64 may include a bolster trim cover 110, a pad 112, and a bolster trim cover stiffener 114.

The bolster trim cover 110 may form a visible exterior surface of the bolster subassembly 30. As such, the bolster trim cover 110 may at least partially cover or conceal the bolster frame 60 and the bolster cushion 62. The bolster trim cover 110 may be made of any suitable material, such as fabric, vinyl, leather, or combinations thereof. The bolster trim cover 110 may be separate from the trim cover assembly 20, thereby allowing the bolster subassembly 30 to be assembled to the seat back 14 independently of the trim cover assembly 20.

The pad 112 may be disposed along an interior surface of the bolster trim cover 110 may be disposed opposite the visible exterior surface. As such, the pad 112 may be disposed proximate and may engage the bolster frame 60 and the bolster cushion 62. For example, the pad 112 may be disposed on the bolster frame 60 where the bolster cushion 62 is not provided, such as along the front wall 92 and near the perimeter of the bolster frame 60. The pad 112 may be secured to the bolster trim cover 110 in any suitable manner, such as with stitching, an adhesive, or combinations thereof. The pad 112 may provide additional cushioning and may help improve the appearance of the bolster trim cover 110.

The bolster trim cover stiffener 114 may facilitate mounting of the bolster trim subassembly 64 to the seat back 14. As is best shown in FIGS. 6-8, the bolster trim cover stiffener 114 may be disposed proximate and may extend from an end or edge of the bolster trim cover 110. As such, the bolster trim cover stiffener 114 may extend past or protrude from an end or edge of the bolster trim cover 110. The bolster trim cover stiffener 114 may be made of any suitable material, such as a polymeric material. As such, the bolster trim cover stiffener 114 may be stiffer and more rigid than the bolster trim cover 110 and the pad 112. The bolster trim cover stiffener 114 may also be attached to the bolster trim cover 110 and the pad 112 in any suitable manner, such as with one or more fasteners, stitching, an adhesive, or combinations thereof.

One or more bolster trim cover stiffeners 114 may be provided with the bolster trim subassembly 64. For instance, a single bolster trim cover stiffener 114 may be provided along a side or edge of the bolster trim cover 110 or multiple bolster trim cover stiffeners 114 may be provided as separate components that may be spaced apart from each other. The configuration of the bolster trim cover stiffener 114 may be constant or may vary at different locations. Different bolster trim cover stiffener cross section configurations are illustrated with reference to FIGS. 6-8.

Referring to FIG. 6, a bolster trim cover stiffener 114 or portion of a bolster trim cover stiffener 114 is shown that has a generally rectangular or linear cross section. Such a configuration may be provided at or near the mounting tabs 56 of the back panel 28. For instance, this configuration may be provided near or between adjacent mounting openings 74 in the perimeter wall 90 that receive the mounting tabs 56. In such a configuration, the bolster trim subassembly 64 may wrap around the end of the perimeter wall 90 such that the bolster trim cover stiffener 114 and a portion of the bolster trim cover 110 and the pad 112 may be disposed in the mounting channel 72 between the back panel 28 and the perimeter wall 90. The bolster trim cover stiffener 114 may be completely or partially received in the mounting channel 72 and may be disposed proximate and may engage the perimeter wall 90 of the bolster frame 60. In addition, the bolster trim cover 110 may be disposed proximate and may engage the back panel 28 and the bolster trim cover stiffener 114 may be spaced apart from and may not engage the back panel 28.

Referring to FIG. 7, a bolster trim cover stiffener 114 or portion of a bolster trim cover stiffener 114 is shown that has a generally L-shaped cross-section. In such a configuration, the bolster trim subassembly 64 may wrap around the end of the perimeter wall 90 such that a portion of the bolster trim cover 110, pad 112, and bolster trim cover stiffener 114 may be disposed in the mounting channel 72 between the back panel 28 and the perimeter wall 90. A bolster trim cover stiffener 114 or portion thereof that has a generally L-shaped cross-section may include a first stiffener wall 120 and the second stiffener wall 122.

The first stiffener wall 120 may be attached to the bolster trim cover 110. The first stiffener wall 120 may be at least partially received in the mounting channel 72 and may be disposed proximate and may engage the perimeter wall 90.

The second stiffener wall 122 may extend from the first stiffener wall 120. For instance, the second stiffener wall 122 may extend from an end of the first stiffener wall 120 in a direction that extends away from the perimeter wall 90. Similar to FIG. 6, the bolster trim cover 110 and the bolster trim cover stiffener 114 may be received between the bolster frame 60 and the back panel 28 when the bolster subassembly 30 is mounted to the seat back frame 24. For instance, the second stiffener wall 122 may be secured between the bolster frame 60 and the end surface 54 of the back panel 28 that is received in the mounting channel 72.

Referring to FIG. 8, a bolster trim cover stiffener 114 or portion of a bolster trim cover stiffener 114 is shown that has a generally L-shaped cross-section similar to FIG. 7. Such a configuration may be provided near a bolster trim cover support feature 76 of the bolster frame 60. As such, the second stiffener wall 122 may be received in the mounting channel 72 and may extend toward the bolster trim cover support feature 76. For instance, the second stiffener wall 122 may be disposed proximate and may engage the second wall 102 of the bolster trim cover support feature 76.

The bolster subassembly 30 described above may allow a modular bolster to be provided with a seat assembly. For example, the bolster subassembly 30 may be preassembled and shipped to an assembly plant where it may be installed on a seat back 14. The L-shaped cross-section of the bolster trim cover stiffener 114 may cooperate with the bolster trim cover support feature 76 to help secure the bolster trim cover 110 to the bolster frame 60 during shipment and handling. During assembly to the seat back 14, the bolster subassembly 30 may be initially secured by the mounting tabs 56 on the back panel 28 and further secured by way of one or more mounting arms 70. After assembly to the seat back 14, the bolster trim cover stiffener 114 may be trapped between the back panel 28 and the bolster frame 60 to further secure the bolster trim subassembly 64.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
 a seat back that includes:
  a seat back frame;
  a back panel that is disposed on the seat back frame, the back panel having a plurality of mounting tabs that extend away from the seat back frame; and
 a bolster subassembly that includes:
  a bolster frame having a plurality of openings that receive corresponding ones of the mounting tabs of the back panel to mount the bolster frame to the back panel;
  a bolster cushion that is disposed on the bolster frame; and
  a bolster trim subassembly that is disposed on the bolster cushion and that includes a bolster trim cover and a bolster trim cover stiffener that extends from an edge of the bolster trim cover, wherein the bolster trim cover and the bolster trim cover stiffener are received between the bolster frame and the back panel when the bolster subassembly is mounted to the seat back frame and wherein the bolster frame has a mounting channel that receives the back panel and the bolster trim subassembly.

2. The seat assembly of claim 1 wherein the bolster trim cover stiffener engages the bolster frame and the bolster trim cover engages the back panel.

3. The seat assembly of claim 1 wherein the bolster frame has an inner wall, a front wall that extends from the inner wall, and a perimeter wall that extends from the front wall and is spaced apart from the inner wall, wherein the mounting channel is at least partially defined by the inner wall, the front wall, and the perimeter wall.

4. The seat assembly of claim 3 wherein the plurality of openings are provided in the perimeter wall.

5. The seat assembly of claim 4 wherein the back panel engages the perimeter wall and is spaced apart from and does not engage the inner wall.

6. The seat assembly of claim 4 wherein the bolster trim cover wraps around the perimeter wall and the bolster trim cover stiffener is received in the mounting channel between the back panel and the perimeter wall.

7. The seat assembly of claim 6 wherein the bolster frame has an opening that receives a mounting tab of the back panel.

8. A seat assembly comprising:
a seat back that includes:
a seat back frame;
a back panel that is fixedly disposed on the seat back frame and that defines a back side of the seat back; and
a bolster subassembly that includes:
a bolster frame that is mounted to the seat back frame, the bolster frame having a mounting channel that is disposed along a lateral side of the seat back and a mounting arm that extends away from the mounting channel, wherein the mounting arm is fastened to the seat back frame and the back panel; and
a bolster trim subassembly that includes a bolster trim cover and a bolster trim cover stiffener that is attached to the bolster trim cover, wherein the bolster trim cover, the bolster trim cover stiffener, and the back panel are received in the mounting channel.

9. The seat assembly of claim 8 wherein the mounting arm engages the seat back frame and a fastener extends from the mounting arm through the seat back frame and into the back panel to couple the bolster subassembly to the seat back frame and the back panel.

10. The seat assembly of claim 9 wherein the seat back frame has a mounting flange that protrudes from the seat back frame, wherein the mounting arm is disposed on the mounting flange.

11. The seat assembly of claim 10 wherein the back panel has an alignment feature and the mounting flange has a mounting flange slot that receives the alignment feature.

12. The seat assembly of claim 11 wherein the mounting arm is disposed on the mounting flange adjacent to the mounting flange slot.

13. A seat assembly comprising:
a seat back that includes:
a seat back frame;
a back panel disposed on the seat back frame; and
a bolster subassembly that includes:
a bolster frame that is disposed on the seat back frame and the back panel, wherein the bolster frame has a perimeter wall and a front wall that at least partially define a mounting channel that receives the back panel; and
a bolster trim subassembly that is disposed on the bolster frame and that includes a bolster trim cover and a bolster trim cover stiffener that is attached to the bolster trim cover, wherein the bolster trim cover and the bolster trim cover stiffener are received in the mounting channel and the bolster trim cover stiffener is secured between the back panel and the bolster frame.

14. The seat assembly of claim 13 wherein the bolster trim cover stiffener engages the bolster frame and an end surface of the back panel that is received in the mounting channel.

15. The seat assembly of claim 14 wherein the bolster frame includes a bolster trim cover support feature that extends from the front wall and supports the bolster trim cover stiffener.

16. The seat assembly of claim 15 wherein the bolster trim cover support feature includes a first wall that extends from the front wall toward the back panel and a second wall that extends from the first wall toward the perimeter wall.

17. The seat assembly of claim 16 wherein the second wall extends from an end of the first wall.

18. The seat assembly of claim 16 wherein the second wall extends toward the end surface of the back panel.

19. The seat assembly of claim 18 wherein the bolster trim cover stiffener has a first stiffener wall that is attached to the bolster trim cover and a second stiffener wall that extends from the first stiffener wall toward the bolster trim cover support feature.

20. The seat assembly of claim 19 wherein the bolster trim cover stiffener is disposed on the second wall.

* * * * *